Figure 1:
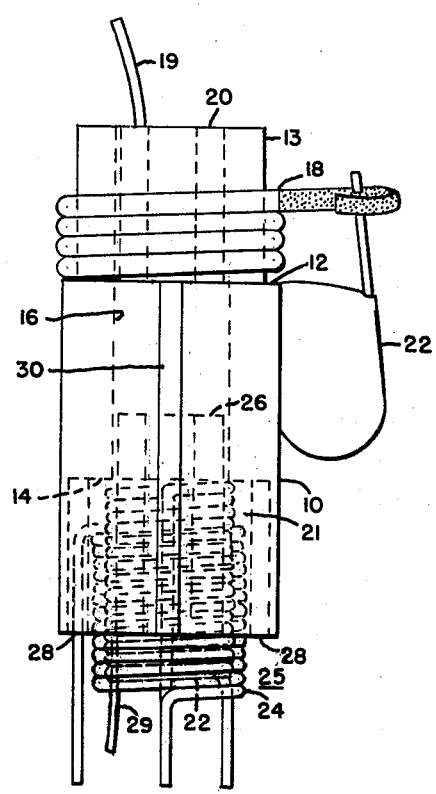

March 2, 1965

V. T. HAWTHORNE 3,172,065

ELECTRICAL COIL STRUCTURE

Filed May 24, 1962

INVENTOR:
VAUGHN T. HAWTHORNE,
BY *Joseph Levinson*
HIS ATTORNEY.

__3,172,065__
__ELECTRICAL COIL STRUCTURE__
Vaughn T. Hawthorne, Liverpool, N.Y., assignor to General Electric Company, a corporation of New York
Filed May 24, 1962, Ser. No. 197,495
3 Claims. (Cl. 336—208)

This invention relates to an improved electrical coil structure which is particularly useful for intermediate frequency coil assemblies utilized in electronic communication equipment.

Intermediate frequency transformers are employed between the amplifier stages to give uniform amplification over the required intermediate frequency band and at the same time provide reasonable selectivity. In practical intermediate frequency amplifiers, for example, those used in television receivers, special trap circuits are required for suppressing the accompanying sound that is present from adjacent television channels. Suppression may be accomplished with the aid of a low resistance resonant circuit tuned to the undesired frequency and coupled to the intermediate frequency transformer so that a large resistance will be introduced into the interstage network at the frequency to be suppressed. The transformer of this unit consists of several turns of wire wound simultaneously with one winding inside the other. A single, threaded core threads into the inner winding and tunes both coils of the transformer simultaneously. The trap winding has a capacitor connected across the winding which includes a threaded tuning core. The distance between the transformer and the trap coil determines the amount of energy absorbed by the trap.

One form of construction commonly utilized for the intermediate frequency transformer and trap coil consisted of a transformer mounted on one coil form and the trap winding wound on a separate coil form. The trap winding was then assembled to the coil form containing the transformer in a jig which would adjust the spacing between the transformer and the trap to obtain the desired amount of absorption by the trap. The cost of labor to adjust the spacing of the trap coil with the transformer was excessive as was the use of two coil forms.

Accordingly, it is an object of this invention to provide a coil structure which is less expensive and overcomes the aforesaid disadvantages.

A further object of this invention is to provide an improved coil construction which utilizes a unitary coil form having a plurality of windings accurately located thereon.

Still another object of this invention is to provide an improved coil structure which accurately spaces at least two coils thereon thereby eliminating the necessity of providing a jig operation during the assembly for providing the proper spacing of such coils.

In carrying out this invention in one illustrative embodiment thereof, a coil construction is provided in which a unitary coil form is utilized having an outer shoulder thereon for positioning at least one coil element on the coil form and an integral inner shoulder therein for positioning at least another winding with respect to the winding on the outer shoulder.

Figure 2:
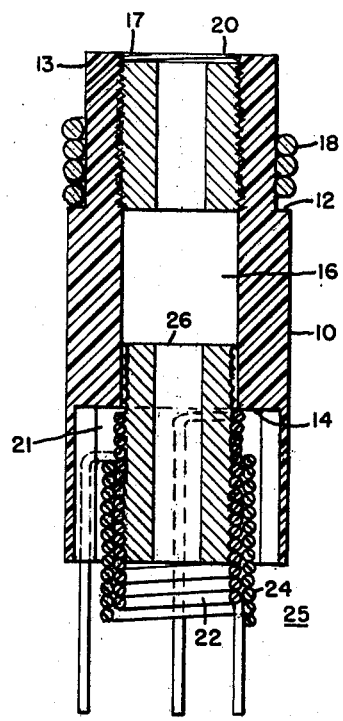

The invention, both as to organization and method of operation, together with further objects and advantages thereof may best be understood by reference to the following description taken in connection with the accompanying drawings, in which:

FIGURE 1 is a side elevational view of the improved coil structure embodied in this invention, and FIGURE 2 is a cross-sectional view of FIGURE 1.

Referring now to the drawings, the coil structure embodied in this invention includes a one-piece, molded coil form 10 having an upper shoulder 12, an upper annular portion 13 and a lower integral, internal shoulder 14 which is discretely spaced from the external shoulder 12. The unitary coil form 10 has a central bore 16 therethrough and a larger opening 21 in the lower portion thereof which terminates at the integral, inner shoulder 14. Mounted on the upper annular portion 13 is a coil or winding 18 which is referred to as the trap winding 18. The trap winding 18 has a capacitor 22 soldered across its terminals. A threaded tuning core for tuning the trap coil 18 positioned in the upper annular portion 13 of the coil form 10 by a threaded portion 17 in the upper end of bore 16. As seen in FIGURE 1, a torque cord 19 is positioned between the threaded core 20 and the threading 17 in the coil form 10 to hold the core in position once it is adjusted.

In the lower opening 21 of the unitary coil form 10, a transformer 25 having windings 22 and 24 is positioned against the integral inner shoulder 14. The transformer 25 consists of several turns of wire wound simultaneously with the winding 22 inside the winding 24. A threaded core 26 threads into the inner winding 22 and tunes both coils simultaneously. As may be seen on FIGURE 1, a plurality of channels 28 may be molded in the lower portion of the unitary coil form to provide passage for the end leads of the transformer. A torque cord 29 is provided between the inner transformer winding 22 and the threaded core 26 to hold the core in position once it is tuned. The unitary coil form 10 also is provided with an indexing rib 30 which is useful during the assembly of the trap portion of the unit and may also be useful in ultimately assembling the unit in an electronic apparatus.

In assembly the trap winding 18 is pushed on to the annular portion 13 into contact with the shoulder 12 of the unitary coil form 10. The capacitor 22 is then soldered to the trap winding 18 and the trap coil 18 is cemented to the coil form 10. Next, the tuning core 20 along with the torque cord 19 is placed in the coil form 10 to complete the trap coil assembly. The transformer 25 is placed in the opening 21 of the coil form 10 and positioned against the shoulder 14 with the outer leads being positioned in the channels 28. The transformer is cemented in place. It should be noted that the spacing between the trap winding 18 and the transformer 25 is set by the geometry of the coil form, i.e. the spacing between the outer shoulder 12 and the integral, inner shoulder 14. This effectively eliminates the necessity for some sort of jig operation to accurately position the coils.

The unitary one-piece construction of the coil form 10 with its predetermined geometry for accurately spacing the various coil elements provides a great saving in cost in the coil form and in the assembling operation. Although the invention has been discussed with respect to a particular application of an intermediate frequency transformer with a trap coil, it will be appreciated by those skilled in the art that the invention has application to various types of coil structure in which a plurality of coils must be accurately positioned or spaced in relation to another coil or coils.

Since other modifications varied to fit particular operating requirements and environments will be apparent to those skilled in the art, the invention is not considered limited to the examples chosen for purposes of disclosure and covers all changes and modifications which do not constitute departures from the true spirit and scope of this invention.

What I claim as new and desire to secure by Letters Patent of the United States is:

1. A coil structure comprising a molded, unitary coil form having an external shoulder and an internal shoulder spaced from said external shoulder, a winding positioned on said coil form and against said external shoulder, at least another winding positioned in said coil form and against said internal shoulder whereby the coupling between said windings is determined by the spacing between said shoulders.

2. A coil structure comprising a one-piece coil form having an opening thereon which is terminated by an internal shoulder, in said coil form, an external shoulder on said coil form spaced from said internal shoulder in said coil form, an annular portion extending from said external shoulder, a winding mounted on said annular portion of said coil form against said external shoulder, a winding mounted in said opening of said coil form against said internal shoulder whereby the coupling between said winding is predetermined by the spacing between said shoulders.

3. A coil assembly comprising a coil form, a straight opening extending through said coil form, said opening being larger at one end portion than at the other, a first shoulder separating the larger portion of said opening from the smaller portion, a second shoulder on the outer surface of said coil form parallel to said first shoulder, spaced therefrom and remote from the larger end of said opening, a coil mounted within said opening against said first shoulder, a coil mounted on the outside of said coil form against said second shoulder, whereby the coupling between said coils is determined by the spacing between said first and second shoulders.

References Cited by the Examiner
UNITED STATES PATENTS 2,836,805   5/58   Goldsmith _____ 336—136

LARAMIE E. ASKIN, *Primary Examiner.*
JOHN F. BURNS, *Examiner.*